(12) United States Patent
Sung

(10) Patent No.: US 12,542,638 B2
(45) Date of Patent: Feb. 3, 2026

(54) SOUNDING REFERENCE SIGNAL RESOURCE ALLOCATION AND OPPORTUNISTIC BEAMFORMING PREPARATION FOR A USER DEVICE

(71) Applicant: T-MOBILE INNOVATIONS LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 426 days.

(21) Appl. No.: 18/151,263

(22) Filed: Jan. 6, 2023

(65) Prior Publication Data

US 2024/0235768 A1 Jul. 11, 2024

(51) Int. Cl.
  *H04B 7/0452* (2017.01)
  *H04B 7/0456* (2017.01)
  *H04L 5/00* (2006.01)

(52) U.S. Cl.
  CPC ......... *H04L 5/0051* (2013.01); *H04B 7/0452* (2013.01); *H04B 7/0456* (2013.01)

(58) Field of Classification Search
  CPC ... H04L 5/0051; H04B 7/0452; H04B 7/0456; H04B 7/0617
  See application file for complete search history.

(56) References Cited

U.S. PATENT DOCUMENTS

| | | | |
|---|---|---|---|
| 11,233,550 B2 | 1/2022 | Ibrahim et al. | |
| 2013/0083743 A1* | 4/2013 | Koo | H04B 7/0478 370/329 |
| 2021/0050893 A1* | 2/2021 | Park | H04B 7/0617 |
| 2021/0258049 A1* | 8/2021 | Esswie | H04W 72/1263 |
| 2023/0087665 A1* | 3/2023 | Prakash | H04W 88/00 370/235 |
| 2023/0387996 A1* | 11/2023 | Leather | H04W 72/51 |
| 2024/0031103 A1* | 1/2024 | Liu | H04L 5/0051 |

* cited by examiner

*Primary Examiner* — Marcus Smith
*Assistant Examiner* — Raenita Ann Fenner
(74) *Attorney, Agent, or Firm* — SHOOK, HARDY & BACON L.L.P.; Elena K. McFarland

(57) ABSTRACT

Methods, media, and systems are provided for Sounding Reference Signal (SRS) allocation and reciprocity-based beamforming or precoding-based beamforming in a wireless telecommunication network. In embodiments, a fixed wireless access (FWA) device, which may be connected to a base station and a user device (e.g., the user device being in an active or idle mode), is identified. For example, the FWA device can be identified based on a device identifier of the FWA device (e.g., an International Mobile Equipment Identity). In embodiments, an Enhanced Mobile Broadband device (eMBB) is also identified. SRS resource allocation to the FWA or eMBB can be determined based at least in part on a user traffic volume (e.g., corresponding to the base station and an associated coverage area). In embodiments, reciprocity-based beamforming can be provided to the FWA user device upon identifying the FWA user device. In other embodiments, the precoding-based beamforming can be provided.

19 Claims, 8 Drawing Sheets

SOUNDING REFERENCE SIGNAL RESOURCE ALLOCATION AND OPPORTUNISTIC BEAMFORMING PREPARATION FOR A USER DEVICE

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with Sounding Reference Signal (SRS) resource allocation and reciprocity-based beamforming or precoding-based beamforming in a wireless telecommunication network (e.g., including a massive Multiple-Input Multiple-Output (MIMO) communication system), substantially as shown in and/or described in connection with at least one of the figures, and as set forth more completely in the claims.

In aspects set forth herein, and at a high level, the technology described herein relates to SRS resource allocation and beamforming management for types of user devices, such as a fixed wireless access (FWA) user device and an Enhanced Mobile Broadband (eMBB) user device, for example. An FWA user device can include one or more devices (e.g., one or more computing devices, one or more server devices, or one or more combinations thereof). The FWA user device can maintain a database having stored parameters relating to synchronization signals for one or more base stations associated with a provider. As one example, the stored parameters may include base station location data, coverage area data of the coverage area provided by the base station and to the FWA user device, operator identifiers associated with the base station, beamforming data associated with the base station and coverage area, other types of data, or one or more combinations thereof. In some embodiments, the FWA user device and the base station can interface via an Evolved Universal Mobile Telecommunications System Terrestrial Radio Access Network interface, a 5G NR air interface, another type of interface, or one or more combinations thereof.

In embodiments, FWA user devices, eMBB user devices, other types of user devices, or one or more combinations thereof, can be identified based on an International Mobile Equipment Identity (IMEI), another type of device identifier, or one or more combinations thereof. In some embodiments, the eMBB user devices can be identified based on one or more eMBB channels (e.g., an eMBB uplink transmission). As another example, a radio access network (e.g., a massive MIMO radio access network) may interface with a network (e.g., a 5G core network) to request and subsequently receive a list of home internet user devices that are connected (e.g., in an active or idle mode) with a home internet unit, such as the FWA user device.

A home internet unit, in some embodiments, is an FWA user device. In some embodiments, the home internet unit (e.g., the FWA user device) is a femtocell such as a home eNB. In some embodiments, the home internet unit is characterized as a small, low-power FWA user device configured for a home environment, a business environment, another type of local environment, or one or more combinations thereof. In some embodiments, the connection between user devices and the home internet unit comprises a wireless telecommunication service corresponding to a broadband connection. User devices connected with the home internet unit can utilize a network corresponding to a network operator via a wide area network or another connection, for example.

In some embodiments, the list of home internet user devices is generated by one or more communications between or among a Home Subscriber Server, a Mobility Management Entity, another type of server or entity, or one or more combinations thereof. The list of home internet user devices can be used by the radio access network to identify FWA user devices, eMBB user devices, other types of user devices, or one or more combinations thereof.

In embodiments, the reciprocity-based beamforming can be provided to the FWA user devices upon identifying the FWA user devices. In other embodiments, the precoding-based beamforming is provided when the base station is not configured for reciprocity-based beamforming. Furthermore, in some embodiments, SRS resources can be allocated to the identified user devices based at least in part on a user traffic volume (e.g., corresponding to the home internet unit and an antenna or antenna array of a base station). For example, if the user traffic volume is below a threshold, the radio access network can receive one or more SRSs (e.g., that the home internet unit received from the identified user devices) based at least in part on a radio resource control connection. As such, the radio access network can provide channel reciprocity-based beamforming based on the one or more SRSs. Continuing the example, based on the user traffic volume being below the threshold, the identified FWA user devices and eMBB user devices are periodically allocated SRS resources. In another embodiment wherein the user traffic volume is not below the threshold, the identified eMBB user devices are periodically allocated SRS resources and the identified FWA user devices are a-periodically allocated SRS resources with a greater-than-normal amount of time between SRS transmissions.

In some embodiments, the identified FWA user devices and eMBB user devices are assigned a priority. For example, the FWA user devices may be assigned an MU-MIMO priority over the eMBB user devices. In aspects, the FWA user device is assigned an MU-MIMO priority and the eMBB user device is assigned an SU-MIMO priority. As such, the FWA user devices are provided a wireless telecommunication service corresponding to at least one MU-MIMO transmission and the eMBB user devices are provided a wireless telecommunication service corresponding to at least one SU-MIMO transmission. For example, the radio access network can determine a beam weight for the MU-MIMO transmission and a beam weight for the SU-MIMO transmission, and provide those transmissions based on the determined beam weights. In some embodiments, the beam weight is determined based on receiving one or more Precoding Matrix Indicators, one or more uplink signals, one or more SRSs, one or more channel state information reference signals, location data, other types of beam data, or one or more combinations thereof, from one or more user devices connected to a home internet unit.

In some embodiments, an MU-MIMO priority order is determined of each of the identified FWA user devices. For example, the MU-MIMO priority order may be based on one or more channel state information reference signals associated with each of the FWA user devices, location data associated with each of the FWA user devices, other types of received signal quality data, other user device feedback, or one or more combinations thereof. As one example, the channel state information reference signals may comprise a signal to interference and noise ratio for each of the FWA user devices. As another example, the MU-MIMO priority order for the FWA user devices may be further based on a user traffic volume corresponding to the home internet unit and an antenna array of a base station.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
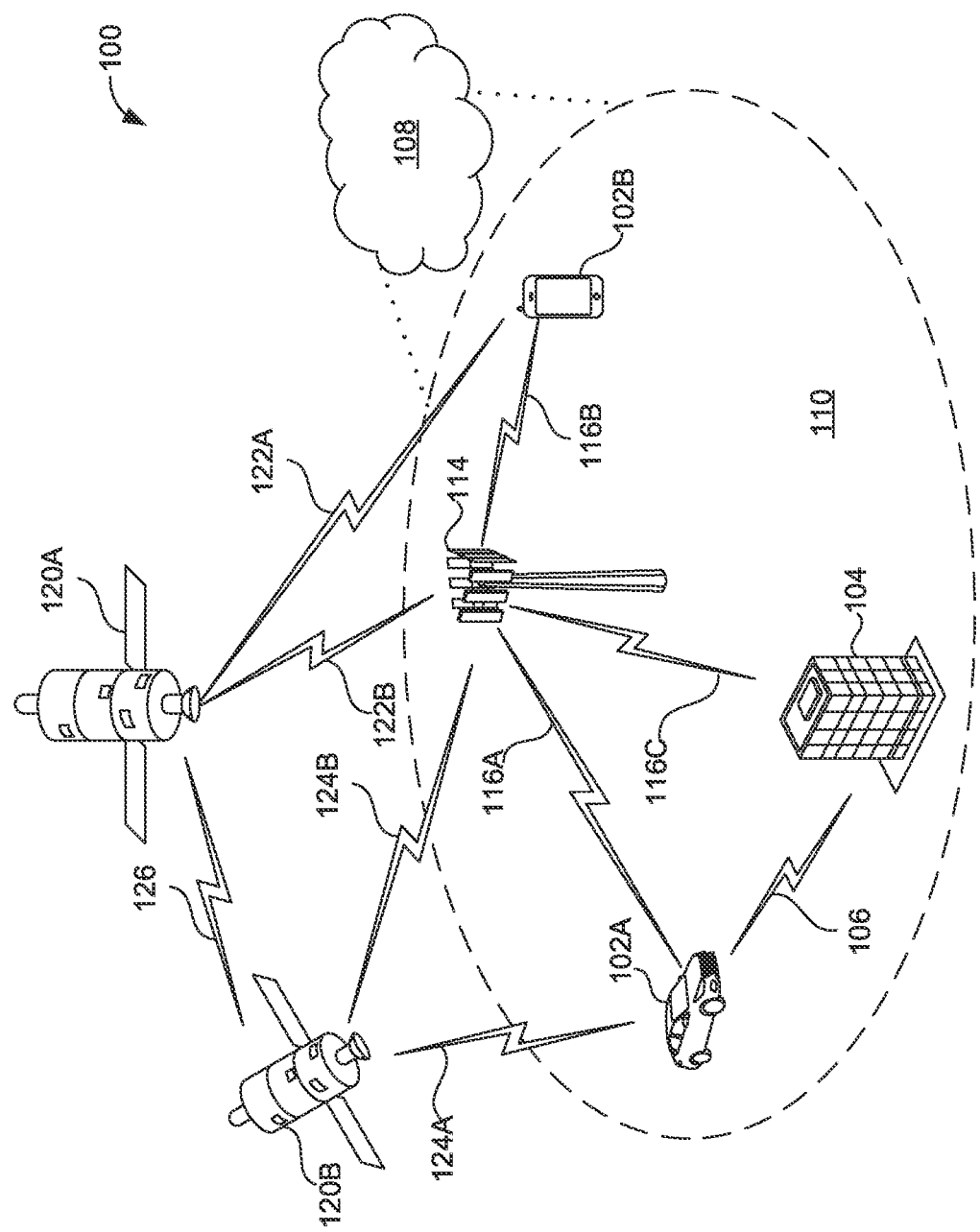
FIG. 1 depicts an example operating environment for resource allocation and beamforming management in a wireless telecommunication network, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Cellular Communication System |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| eNB | Evolved Node B |
| FDD | Frequency Division Duplex |
| gNB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| E-UTRA | Evolved Universal Terrestrial Radio Access |
| FD-MIMO | Full-Dimension Multiple-Input Multiple-Output |
| HSS | Home Subscriber Server |
| IoT | Internet of Things |
| LTE | Long Term Evolution |
| MIMO | Multiple-Input Multiple-Output |
| MME | Mobility Management Entity |
| mmWave | Millimeter waves |
| MU-MIMO | Multi-User Multiple-Input Multiple-Output |
| NR | New Radio |
| PC | Personal Computer |
| PDA | Personal Digital Assistant |
| PDCCH | Physical Downlink Control Channel |
| PDSCH | Physical Downlink Shared Channel |
| PUCCH | Physical Uplink Control Channel |
| PUSCH | Physical Uplink Shared Channel |
| RAM | Random Access Memory |
| RF | Radio-Frequency |
| ROM | Read Only Memory |
| RRC | Radio Resource Control |
| RSRP | Reference Transmission Receive Power |
| RSRQ | Reference Transmission Receive Quality |
| RSSI | Received Signal Strength Indicator |
| SINR | Signal-to-Interference and Noise Ratio |
| SRS | Sounding Reference Signal |
| TDMA | Time Division Multiple Access |

In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 102A and 102B described herein with respect to FIG. 1. A user device may also be, in another embodiment, similar to user device 800, described herein with respect to FIG. 8.

A user device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof.

In aspects, a user device discussed herein may be configured to communicate using one or more of 4G (e.g., LTE), 5G, 6G, another generation communication system, or one or more combinations thereof. In some aspects, the user device has a radio that connects with a 4G base station but is not capable of connecting with a higher generation communication system. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Wireless telecommunication services" refer to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mmWave communication, and mobile communication. Embodiments of the present technology may be used with different wireless telecommunication technologies or standards, including, but not limited to, CDMA 1xAdvanced, GPRS, Ev-DO, TDMA, GSM, WiMax technology, LTE, LTE Advanced, other technologies and standards, or one or more combinations thereof.

A "network" providing the wireless telecommunication services may be a telecommunication network(s), or a portion thereof. A telecommunication network might include an array of devices or components (e.g., one or more base stations). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or one or more combinations thereof, to user devices or corresponding users that are registered or subscribed to a telecommunication service provider to utilize the one or more services. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like.

For example, the base station may refer to a base transceiver station, a radio base station, an access point, a radio transceiver, a NodeB, an eNB, a gNB, a Home NodeB, a Home eNodeB, another type base station, or one or more combinations thereof. A node corresponding to the base station may comprise one or more of a macro base station, a small cell or femtocell base station, a relay base station, another type of base station, or one or more combinations thereof. In aspects, the base station may be configured as FD-MIMO, massive MIMO, MU-MIMO, cooperative MIMO, 3G, 4G, 5G, another generation communication system, or one or more combinations thereof. In addition, the base station may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior methods and systems have had drawbacks associated with SRS resource allocation. For example, prior methods and systems that allocate SRS resources on a first come, first served basis cause telecommunication service delays to various user devices, particularly when loading is high (e.g., during a busy hour). Because the number of SRS resources associated with a coverage area are limited, only a portion of the user devices within the coverage area are allocated for one or more SRS resources. As such, only the portion of the user devices that are allocated for the one or more SRS resources can benefit from reciprocity-based beamforming. For example, those user devices that are not allocated SRS resources do not receive downlink transmissions based on channel information from the SRS in the uplink (e.g., which could have minimized effects of channel decorrelation). Furthermore, for the portion of user devices that were allocated for the SRS resources, these user devices also cannot benefit from the reciprocity-based beamforming until the SRS is transmitted in the uplink, which can be delayed when loading is high.

In addition, MU-MIMO beamforming can experience delays associated with traffic transmissions based on the time it takes to search for the user devices to be scheduled on co-channels. As such, beam pattern generation can be delayed during the process of determining inter-beam interferences and during the process of identifying the beam pattern to reduce the inter-beam interference.

The technology provided herein can alleviate the problems discussed above. For example, the technology disclosed herein enhances SRS resource allocation to the user devices within a coverage area, such that these user devices can benefit from reciprocity-based beamforming. Additionally, the technology provided herein can also allow these devices to benefit from precoding-based beamforming even when SRS resources are limited. In this way, the user devices receive improved wireless telecommunication services and experience a reduction of the effects of channel decorrelation. Furthermore, because the SRS resources are strategically allocated to particular devices (e.g., based on particular priorities/device types and particular signal transmissions), these user devices can benefit from the reciprocity-based beamforming even before an SRS is transmitted in the uplink, thereby reducing the likelihood of delayed or degraded wireless telecommunication services when loading is high. In addition, because of the particular priorities assigned to the user devices, MU-MIMO beamforming delays associated with the prior methods and systems are also reduced by the implementation of the disclosed technology.

In an embodiment, a system for reciprocity-based beamforming in a wireless telecommunication network is provided. The system comprises a base station having one or more antennas, one or more processors associated with base station, and computer memory storing computer-usable instructions that, when executed by the one or more processors, perform operations. The operations comprise identifying a fixed wireless access (FWA) user device that is connected to the base station based on a device identifier of the FWA user device. The operations further comprise determining a beam weight based on identifying the FWA user device. The operations also comprise prior to receiving a Sounding Reference Signal (SRS) from the FWA user device, communicating one or more signals from the base station to the FWA user device using the determined beam weight.

In another embodiment, a method is provided for prioritizing Multi-User Multiple-Input Multiple-Output (MU-MIMO) pairing priority for a fixed wireless access (FWA) user device. The method comprises identifying the FWA user device based on a device identifier of the FWA user device. The method also comprises identifying an Enhanced Mobile Broadband (eMBB) user device based on a device identifier of the eMBB user device. The method further comprises assigning the FWA user device an MU-MIMO priority over the eMBB user device. The method also comprises communicating one or more signals from the base station to the FWA user device based on the MU-MIMO priority.

Another embodiment includes one or more non-transitory computer storage media having computer-executable instructions embodied thereon, that when executed by at least one processor, cause the at least one processor to perform a method. The method comprises identifying a fixed wireless access (FWA) user device that is connected to a base station. Based on identifying the FWA user device, the method comprises determining a beam weight for at least one Multi-User Multiple-Input Multiple-Output (MU-MIMO) transmission and at least one Single-User Multiple-Input Multiple-Output (SU-MIMO) transmission. The method also comprises determining whether a user traffic volume, corresponding to the base station, is below a threshold. Based on determining the beam weight for the at least one MU-MIMO transmission, the at least one SU-MIMO transmission, and based on determining whether the user traffic volume is below the threshold, one or more signals are communicated from the base station to the FWA user device.

Turning now to FIG. 1, example environment 100 supports SRS allocation and beamform management in a wireless telecommunication network (e.g., utilizing massive MIMO wireless telecommunications), in accordance with one or more embodiments disclosed herein. Example environment 100 is but one example of a suitable environment for the improved telecommunications disclosed herein, and is not intended to suggest any limitation as to the scope of use or functionality of the invention. Neither should the environment 100 be interpreted as having any dependency or requirement relating to any one or combination of components illustrated.

Example environment 100 includes user devices 102A and 102B, a local environment 104, communication link 106 between user device 102A and local environment 104, network 108, coverage area 110, base station 114, communication links 116A-116C associated with the base station 114, satellites 120A and 120B, communication links 122A and 122B associated with satellite 120A, communication links 124A and 124B associated with satellite 120B, and communication link 126 between satellites 120A and 120B.

Example environment 100 may be associated with one or more of a non-terrestrial network, an LTE network, an LTE-A network, an LTE-A Pro network, an NR network, an mmwave network, another type of network, or one or more combinations thereof. In some embodiments, the example environment 100 may support enhanced broadband communications, ultra-reliable (e.g., mission critical) communications, low latency communications, communications with low-cost and low-complexity devices, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof.

User devices 102A and 102B may wirelessly communicate via one or more wireless telecommunication services provided by one or more base stations (e.g., base station 114), one or more satellites (e.g., satellites 120A and 120B), other types of wireless telecommunication devices, or one or more combinations thereof. In example environment 100, network 108, an access node within local environment 104 (e.g., a home internet unit), base station 114, and satellites 120A and 120B can provide a coverage area 110 for supporting communication signals according to one or more radio access technologies. Supported communication signals within coverage area 110 can include MU-MIMO and SU-MIMO transmissions, for example.

In embodiments, the user devices 102A and 102B can be stationary, mobile, or one or more combinations thereof at different times. In embodiments, the user devices 102A and 102B may have different capabilities. The user devices 102A and 102B can be devices in different forms or devices having different capabilities. The user devices 102A and 102B may be able to communicate with various types of devices, such as other UEs, the base station 114, or network equipment (e.g., core network nodes, relay devices, integrated access and backhaul nodes, other network equipment, or one or more combinations thereof). The user devices 102A and 102B are also able to communicate using one or more MIMO transmissions.

The user devices 102A and 102B may include a unit, a station, a terminal, or a client, for example. The user devices 102A and 102B may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, user devices 102A and 102B may be implemented in various objects such as appliances, or vehicles, meters, and other objects. In some embodiments, the user devices 102A and 102B may sometimes act as a relay as well as the base station 114 and the network equipment including macro eNBs or gNBs, small cell eNBs or gNBs, or relay base stations, for example.

In some embodiments, another type of user device is an FWA user device. For example, the FWA user device may utilize wireless broadband communications effectuated between two or more fixed locations. As another example, the FWA user device can support software-based networking in a wide area network with traffic bursting. The FWA device, in some embodiments, determines a signal strength and measurements corresponding to connection quality (e.g., performance rating, upload speed, download speed, a latency measurement associated with an orientation and location of the FWA device). Additionally, in some embodiments, t another type of user device is an eMBB user device. The eMBB user device is a device that is capable of supporting eMBB communications. The eMBB communications may include eMBB data and control information that is different from the quality of service type transmissions corresponding to ultra-reliable low-latency communications (e.g., the eMBB communications having more relaxed latency constraints). The eMBB user device can be assigned or granted particular air link resources for the eMBB communications.

Local environment 104 may include a home environment, a business environment, another type of local environment, or one or more combinations thereof. The local environment 104 may include one or more home internet units (e.g., FWA user device), which can be characterized as a small, low-power FWA device (e.g., a home eNB, a home NodeB, a femtocell). The FWA device can, in some embodiments, allow restricted access by user devices (e.g., user device 102A) having association with the FWA device (e.g., user devices in a Closed Subscriber Group). In some embodiments, the FWA device is associated with a home IoT network, a vehicle IoT network, an HSS, an MME, or one or more combinations thereof. The FWA device can generate a list of home internet user devices that are connected (e.g., in active or idle mode) for access to a wide area network or another connection associated with an operator, for example.

For instance, the list can be generated based at least in part on authentication communications between the FWA device and the HSS, in some embodiments. As another example, the list can be generated based on globally unique MME identifiers and communications between an MME and the FWA. In yet another example, the list can be generated based on an International Mobile Equipment Identity (IMEI) of the FWA device or other types of home internet units, another type of device identifier of the FWA device or other home internet unit, or one or more combinations thereof. The list of home internet user devices can be used for identifying FWA user devices, eMBB user devices, or other types of devices.

Network 108 can provide one or more various wireless telecommunication services and can be one or more telecommunication networks or a portion of a telecommunication network. In some embodiments, network 108 is a network of networks. In some embodiments, the network is a core network (e.g., a 5G Core Network, an evolved packet core). For example, the core network can provide user authentication, tracking, IP connectivity, access authorization, other types of access, mobility, and routing functions, or one or more combinations thereof. The core network can include a control plane entity for managing access and mobility, a user plane entity that routes packets or interconnects with external networks (e.g., a serving gateway). In some embodiments, the network 108 can provide operator services, such as access to Internet, access to Intranet, an IP Multimedia Subsystem, a Packet-Switched Streaming Service, another type of operator service, or one or more combinations thereof. Base station 114 may communicate with the network 108 via a core network, one or more other base stations, one or more satellites, or one or more combinations thereof, over one or more backhaul links (e.g., via an X2, Xn, or other interface) either directly (e.g., directly between base stations), or indirectly (e.g., via core network), or one or more combinations thereof. The backhaul links may be or include one or more wireless links, for example.

Base station 114 may operate using MIMO transmissions (e.g., the base station 114 can be configured as FD-MIMO, massive MIMO, MU-MIMO, cooperative MIMO, 3G, 4G, 5G, another generation communication system, or one or more combinations thereof) for providing telecommunication services to one or more of user devices, or one or more combinations thereof. The base station 114 may perform one or more of the following functions: transfer user data, radio channel ciphering and deciphering, integrity protection, header compression, mobility control functions (e.g., handover, dual connectivity), inter-cell interference coordination, connection setup and release, load balancing, distribution for non-access stratum messages, NAS node selection, synchronization, radio access network sharing, multimedia broadcast multicast service, subscriber and equipment trace, radio access network information management, paging, positioning, and delivery of warning messages.

In some embodiments, one or more base station antennas or antenna arrays may be co-located at an antenna assembly, such as an antenna tower. In some examples, antennas or antenna arrays associated with base station 114 may be located in diverse geographic locations. In some aspects, one or more nodes corresponding to base station 114 may comprise one or more macro cells, one or more small cells, one or more relay base stations, one or more repeaters, one or more femtocells, other types of cells, or one or more combinations thereof. In some embodiments, base station 114 may be movable and therefore provide communication coverage for a moving geographic coverage area 110. Further, communication links 116A-116C may use MIMO antenna technology, including spatial multiplexing, beamforming, transmit diversity, other MIMO functions, or one or more combinations thereof. Communication links 116A-116C may be through one or more carriers.

Satellites 120A and 120B may communicate with base station 114 and user devices 102A and 102B (or other high altitude or terrestrial communications devices, for example). "Satellite" is also referred to as a space vehicle or communication satellite. Satellites 120A and 120B may be any suitable type of communication satellite configured to relay communications between different end nodes in a wireless communication system. Satellites 120A and 120B may be or include a space satellite, a balloon, a dirigible, an airplane, a drone, an unmanned aerial vehicle, another type of satellite, or one or more combinations thereof. In some examples, the satellites 120A and 120B may be in a geosynchronous or geostationary earth orbit, a low earth orbit, a medium earth orbit, another type of orbit, or one or more combinations thereof. In some embodiments, satellites 120A and 120B may be a multi-beam satellite configured to provide service for multiple service beam coverage areas in a predefined geographical service area (e.g., coverage area 110). The satellites 120A and 120B may be any distance away from the surface of the earth.

In some embodiments, satellites 120A and 120B may be deployed at an altitude of 18 km to 25 km (e.g., a geostationary balloon satellite), wherein the stratosphere has low wind speeds (e.g., 5 m/s to 40 m/s) and low turbulence. In this example, satellites 120A and 120B may be configured to communicate via communication link 126. As such, the communication link 126 may include a free space optical link, a microwave link, electromagnetic wave signals via mmWaves, optical signals via a laser, another type of communication link, or one or more combinations thereof. Continuing the example, satellites 120A and 120B may be configured to communicate via a wireless common public radio interface protocol, a dedicated wireless front haul protocol developed for high-altitude-to-high-altitude, another protocol, or one or more combinations thereof.

In some embodiments, a cell may be provided or established by satellites 120A and 120B as part of a non-terrestrial network. Satellites 120A and 120B may, in some cases, perform the functions of base station 114, act as a bent-pipe satellite, act as a regenerative satellite, act as another type of satellite, or one or more combinations thereof. In other cases, satellites 120A and 120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base station 114) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa.

User devices 102A and 102B may communicate with satellites 120A and 120B using communications links 122A and 124A, for example. In some embodiments, timing adjustments may be used to account for propagation delays associated with communications links 122A and 124A, propagation delays associated with communication links 116A-116C between one of the user devices 102A and 102B and the base station 114, propagation delays associated with communication links 122B and 124B between base station 114 and satellites 120A and 120B, as well as a variation in the propagation delays due to movement of the satellites 120A and 120B. For example user devices 102A and 102B may account for variation in propagation delay when determining an uplink timing for uplink communications via one or more of satellites 120A and 120B.

Satellites 120A and 120B may have one or more antennas, which may be used to employ techniques including transmit diversity, receive diversity, MIMO communications, mmWave communications, beamforming, mmWave beamforming, other types of techniques, or one or more combinations thereof. These MIMO communications may employ multipath signal propagation to increase the spectral efficiency by transmitting or receiving multiple signals via different spatial layers, which may be referred to as spatial multiplexing. Further, these techniques may be employed by the one or more antennas of the satellites 120A or 120B via different antennas or different combinations of antennas, for example. Different spatial layers may be associated with different antenna ports used for channel measurement and reporting.

Further, satellites 120A and 120 can shape or steer one or more beams along a spatial path between the respective satellite and a user device, for example. Beamforming can be implemented by combining signals communicated by the satellite antenna elements of an antenna array, such that signals propagating at an orientation associated with the antenna array are adjusted by an amplitude offset or a phase offset associated with a constructive or destructive interference. The amplitude offset and phase offset may be associated with a beamforming weight. In some embodiments, a plurality of antenna arrays of the satellites 120A or 120B conduct beamforming operations by transmitting signals (e.g., synchronization signals, reference signals, beam selection signals, other control signals, other types of beamforming signals, or one or more combinations thereof) multiple times in different directions. For example, an antenna array of at least one of the satellites 120A or 120B can transmit a signal according to different beamforming weight sets associated with different directions of transmission.

In embodiments, base station 114 and satellites 120A and 120B can each transmit beams in a plurality of spatial directions. As such, user devices 102A and 102B can perform beam sweeps with the base station 114 or at least one of satellites 120A and 120B. In some embodiments, user devices 102A and 102B can transmit one or more beams in a plurality of different spatial directions and the base station 114 and satellites 120A and 120B can listen or scan for the beam transmissions.

In embodiments, the base station 114, satellites 120A or 120B, or one or more combinations thereof, can provide channel reciprocity-based beamforming to one or more FWA user devices identified (e.g., identified from the list of home internet user devices corresponding to the home internet unit of local environment 104). In some embodiments, the channel reciprocity-based beamforming is provided before receiving an SRS from the FWA user device identified. For example, in one implementation, the reciprocity-based beamforming is provided by combining signals communicated by the satellite antenna elements of an antenna array, wherein the signals propagate at an orientation associated with the antenna array based on an amplitude offset, a phase offset, another type of adjustment factor, or one or more combinations thereof, corresponding to historical RRC connected sessions with the FWA user device, other FWA user devices within an associated coverage area, or one or more combinations thereof. In some embodiments, reciprocity-based beamforming is provided by the antennas of the satellites 120A or 120B via different combinations of antennas. In some embodiments, reciprocity-based beamforming is provided based on an uplink timing for an uplink communication with one or more of satellites 120A and 120B and another FWA user device within a threshold distance of the FWA user device. In some embodiments, reciprocity-based beamforming is provided based on SRSs received from another user device connected to the base station, another user device within a threshold distance of the FWA user device, or one or more combinations thereof.

In embodiments wherein one or more of the user devices 102A or 102B, base station 114, satellites 120A or 120B, or one or more combinations thereof do not support reciprocity-based beamforming, precoding-based beamforming is provided. In embodiments, the precoding-based beamforming has uplink or downlink carriers in FDD mode. In some embodiments, the base station 114, satellites 120A or 120B, or one or more combinations thereof, may utilize a plurality of analog beams. Continuing the example, beam sweeping can be implemented for symbol-by-symbol changes for a specific slot or subframe for reception opportunities by the user devices 102A or 102B. In some embodiments, SRS resources are periodically allocated (e.g., at equally spaced intervals) to user devices based on a user traffic volume (e.g., associated with the home internet unit, associated with the base station 114, associated with an antenna or antenna array of the base station 114 or one or more of satellites 120A and 120B, or one or more combinations thereof) being below a threshold.

SRSs can be transmitted by FWA device or user devices 102A, 102B (e.g., via the home internet unit) to base station 114 or one or more of satellites 120A and 120B via an uplink, for example. The SRSs can be transmitted periodically (e.g., at equally spaced intervals) or a-periodically (e.g., at unequally spaced intervals). For example, SRSs can be transmitted in a transmission time interval associated with a grant received by the base station 114 or satellites 120A and 120B. In an aspect, the base station 114, satellites 120A or 120B, another transmitter, or one or more combinations thereof, can allocate an SRS configuration to user devices 102A or 102B, an FWA device, an eMBB device, another type of device, or one or more combinations thereof, at a predetermined periodicity or a-periodicity (e.g., during an RRC connection session). As such, the base station 114, satellites 120A or 120B, another transmitter, or one or more combinations thereof, can receive SRSs from user devices (e.g., user device 102A or 102B) connected with a home internet unit, for example, based on the predetermined periodicity or a-periodicity.

SRSs can be used to provide channel state information about a channel in the air interface and can include information corresponding to multipath fading, scattering, Doppler loss of transmitted signals, power loss of transmitted signals, other types of SRS information, or one or more combinations thereof. Base station 114 and satellites 120A and 120B, for example, can use the SRSs for channel quality determinations, timing determinations, resource scheduling and management, beamforming management, power control, or one or more combinations thereof. SRS resources can be cell-specific resources or frequency-specific resources. SRS resources can include one or more symbols (e.g., time resources), cell identifiers, an SRS resource type (e.g., legacy SRS or contention SRS), other SRS resources, or one or more combinations thereof.

The user traffic volume is associated with user device connections (in active or idle mode) with one or more of the base station 114 and satellites 120A and 120B. The user traffic volume can be determined based on data transmissions associated with one or more beams provided by one or more of the base station 114 and satellites 120A and 120B, user device location data, data transmissions within a predetermined period of time, uplink transmission data, downlink transmission data, radio resource control traffic data, network access stratum signaling traffic volumes, control channel physical signaling traffic volumes, handover data, historical transmission data, or one or more combinations thereof. In some embodiments wherein the user traffic volume is not below the threshold, the SRS resources are a-periodically allocated (e.g., at unequally spaced intervals) to the FWA user device and periodically allocated (e.g., at equally spaced intervals) to the eMBB user device.

In embodiments, the base station 114, satellites 120A or 120B, or one or more combinations thereof, can provide the channel reciprocity-based beamforming to one or more user devices identified (e.g., identified via an IMEI of the user devices) based on a determined beam weight. For example, a beam weight can define an adjustment corresponding to an antenna element (e.g., associated with an orientation of a respective antenna array) of a base station or satellite. In embodiments, the beam weight can be determined based on an orientation of an antenna or antenna array of the base station 114 or satellites 120A and 120B, an orientation of the home internet unit, an orientation of the user devices 102A or 102B, other position and location data, or one or more combinations thereof. The beam weight can be associated with one or more of a phase and amplitude for providing the channel reciprocity-based beamforming. For example, the base station 114, satellites 120A or 120B can apply the beam weight to adjust a direction and strength of one or more of a main lobe, null, side lobe, or one or more combinations thereof. A phase weight can be phase-only (e.g., only a phase shift with no amplitude change) or a phase and gain (e.g., phase shift and amplitude gain). In some embodiments, the beam weight is determined by receiving a Precoding Matrix Indicator from one or more user devices connected with the home internet unit, one or more user devices within a threshold distance from the home internet unit, one or more user devices within a particular coverage area associated with the home internet unit, historical Precoding Matrix Indicators associated with home internet users of the home internet unit, or one or more combinations thereof.

In some embodiments, a beam weight is determined for at least one MU-MIMO transmission and/or at least one SU-MIMO transmission. For example, the beam weight for the MU-MIMO transmission may be determined based on one or more received SRSs corresponding to each home internet user device connected to base station 114 or one or more of satellites 120A and 120B. As another example, the beam weight for the SU-MIMO transmission may be determined based on one or more received SRSs corresponding to eMBB user devices. In embodiments, the beam weights can be applied to an azimuth dimension and an elevation dimension. In some embodiments, a plurality of beam weights associated with SRSs received from FWA user devices are stored for one or more MU-MIMO transmissions in an index. In some embodiments, a plurality of beam weights associated with SRSs received from eMBB user devices are stored for one or more SU-MIMO transmissions in an index. The beam weights may be stored in the indexes based on user device location data during particular time intervals. A model (e.g., a machine learning model) can be applied to the beam weights stored in an index to determine a beam weight to apply to an MU-MIMO transmission or an SU-MIMO transmission.

In some embodiments, the identified FWA user devices are assigned an MU-MIMO priority and the identified eMBB user devices are assigned an SU-MIMO priority. In some embodiments, an MU-MIMO priority order for each of the FWA user devices are determined. For example, the MU-MIMO priority order may be based on channel state information reference signals received by the FWA user devices. In some embodiments, the MU-MIMO priority order may additionally or alternatively be determined based on SRSs received from the FWA user devices. In some embodiments, the MU-MIMO priority order may additionally or alternatively be determined based on location data associated with the FWA user devices. In some embodiments, an SU-MIMO priority order may be determined for each of the eMBB user devices based on channel state information reference signals received by the eMBB user devices, location data of the eMBB user devices, SRSs received from the eMBB user devices, other signal reference data, or one or more combinations thereof. As such, a wireless telecommunication service corresponding to the MU-MIMO transmission can be provided to the FWA user devices based on the determined beam weight, the determined MU-MIMO priority order, or one or more combinations thereof. Additionally, a wireless telecommunication service corresponding to the SU-MIMO transmission can be provided to the eMBB user devices based on the determined beam weight, the determined SU-MIMO priority order, or one or more combinations thereof.

Figure 2:
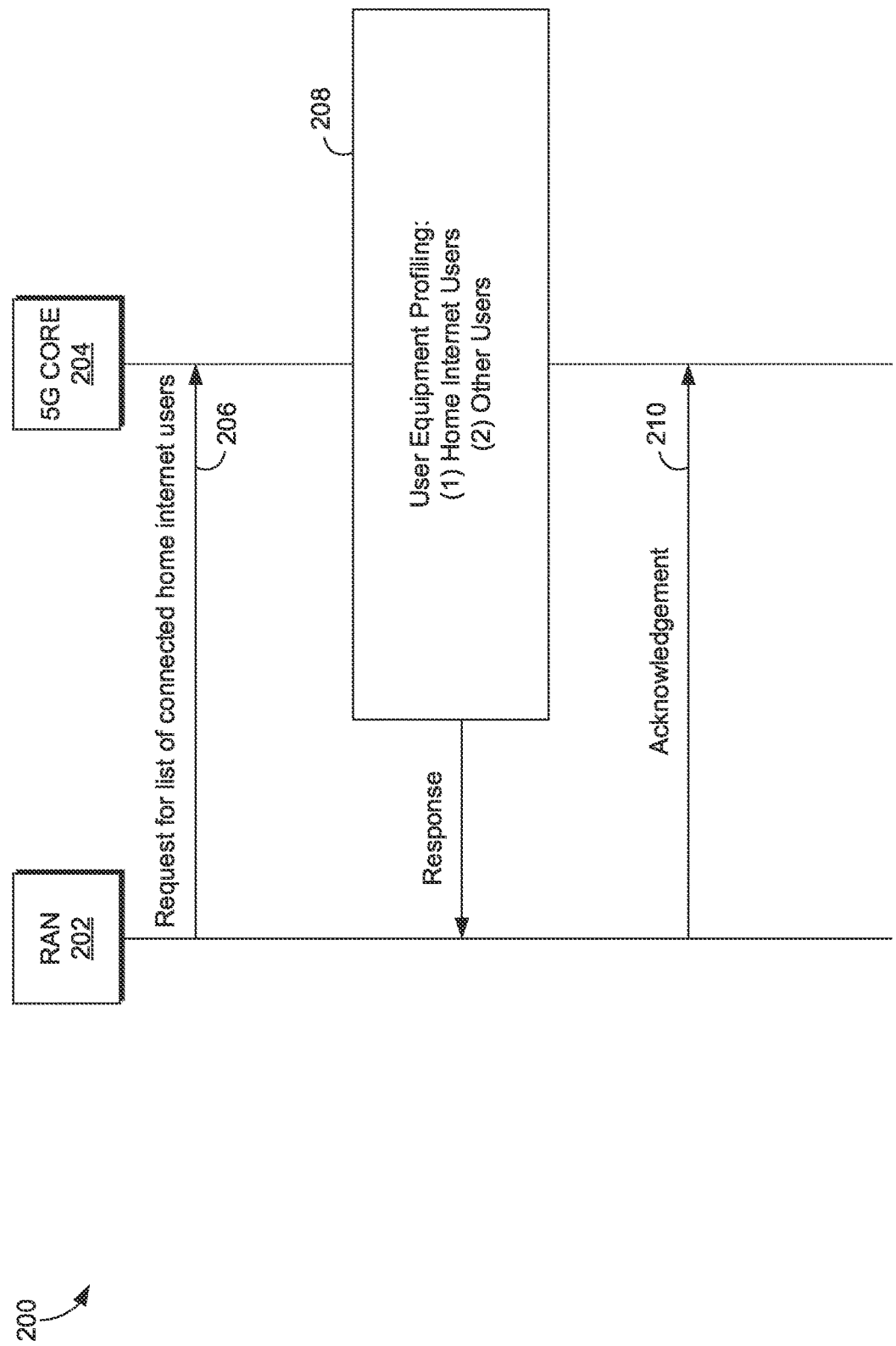
FIG. 2 depicts another example operating environment including a radio access network and a 5G core network, in accordance with aspects herein.

FIG. 2 comprises example environment 200 including wireless network communications between radio access network (RAN) 202 and 5G Core 204. For example, at 206, RAN 202 requests the list of connected home internet users at 206. In embodiments, the list was generated based at least in part on authentication communications between user device and an HSS. In some embodiments, the list was generated based on globally unique MME identifiers. In yet another example, the list was generated based on an IMEI, another type of device identifier, or one or more combinations thereof, corresponding to each of the connected user devices. The list of home internet user devices can be used for identifying FWA user devices and eMBB user devices. As such, at 208, the RAN 202 receives the list of connected home internet users from the 5G Core 204. The list may identify home internet users, other user devices connected with the home internet unit that are not home internet users, or one or more combinations thereof. At 210, an acknowledgement is transmitted to the 5G Core from the RAN 202.

Figure 3:
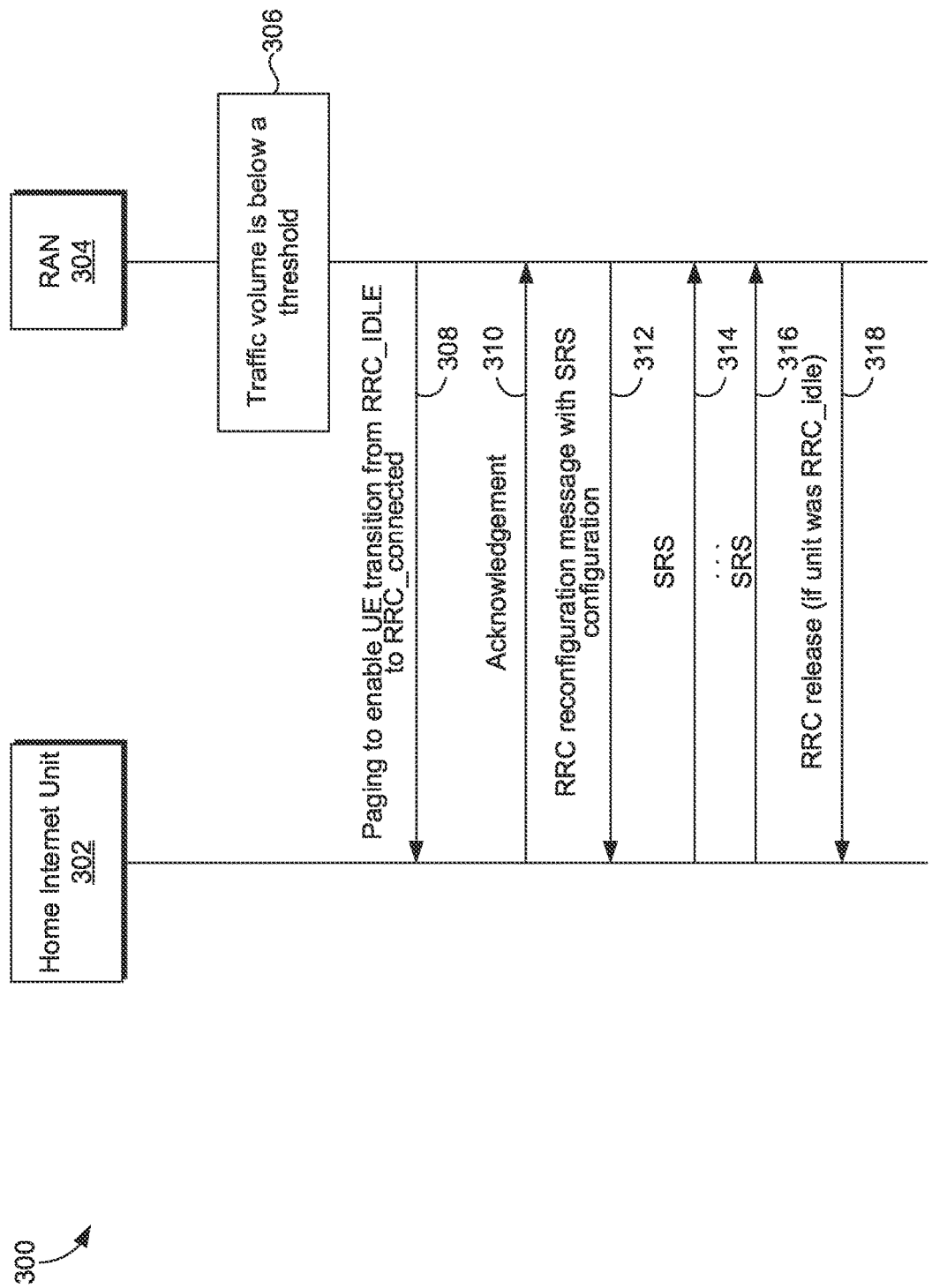
FIG. 3 depicts an example operating environment including a radio access network and a home internet unit, in accordance with aspects herein.

FIG. 3 comprises example environment 300 including wireless network communications between Home Internet Unit 302 (e.g., an FWA device) and RAN 304. At 306, the RAN 304 determines that the user traffic volume is below a threshold. The user traffic volume may be associated with user device connections (in active or idle mode) with RAN 304 (e.g., one or more of the base station 114 and satellites 120A and 120B of FIG. 1). The user traffic volume can be determined based on data transmissions associated with one or more beams provided by RAN 304, user device location data, data transmissions within a predetermined period of time, uplink transmission data, downlink transmission data, radio resource control traffic data, network access stratum signaling traffic volumes, control channel physical signaling traffic volumes, handover data, historical transmission data, or one or more combinations thereof. The determination of whether the user traffic volume is below the threshold may be made based on RAN 202 requesting the list of connected home internet users in FIG. 2.

At 308, RAN 304 transmits a paging to enable UE transitions from RRC_IDLE to RRC_connected, and at 310, the Home Internet Unit 302 transmits an acknowledgement. The transmissions of 308 and 310 are skipped if the Home Internet Unit 302 is already RRC_connected. At 312, RAN 304 transmits an RRC reconfiguration message with an SRS configuration in response to receiving the acknowledgement. At 314 and 316, in response to receiving the RRC reconfiguration message, the Home Internet Unit 302 transmits one or more SRSs associated with one or more user devices connected with the Home Internet Unit 302. At 318, the RAN 304 transmits an RRC release message in the embodiments wherein the Home Internet Unit 302 was RRC_IDLE. As such, channel reciprocity-based beamforming can be provided to user devices connected with the Home Internet Unit 302 based on the user traffic volume being below the threshold and based on the SRS transmissions to the RAN 304.

Figure 4:
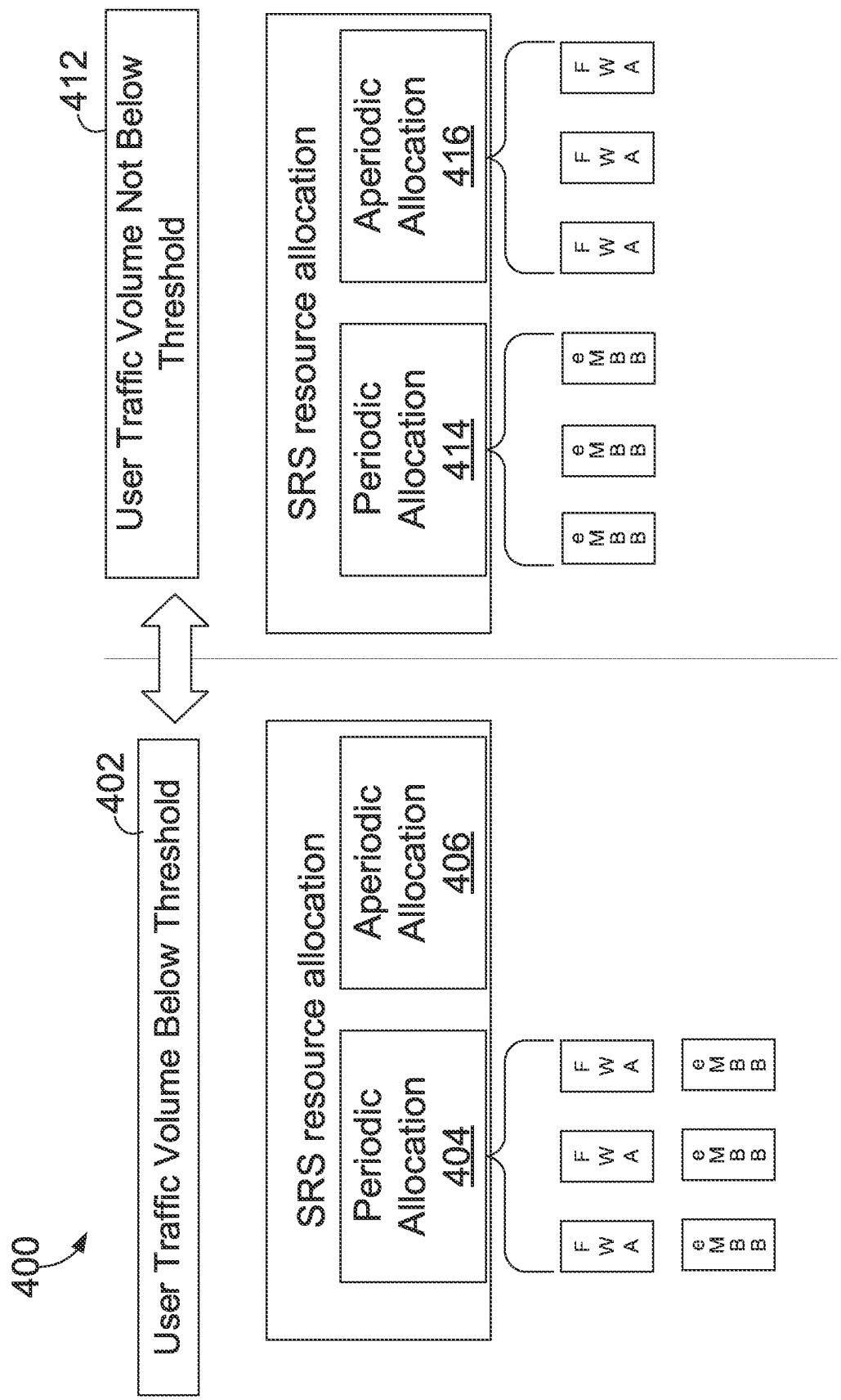
FIG. 4 illustrates an example operating environment associated with sounding reference signal resource allocation based on user traffic volume, in accordance with aspects herein.

FIG. 4 illustrates an example operating environment 400 associated with sounding reference signal resource allocation based on user traffic volume. In example operating environment 400, when the user traffic volume is below the threshold at 402, the SRS resources are allocated to the FWA user devices and eMBB user devices periodically 404, instead of a-periodically allocating the SRS resources at 406. Also in example operating environment 400, when the user traffic volume is not below the threshold at 412, the SRS resources are allocated to the eMBB user devices periodically 414, and the FWA user devices are allocated the SRS resources a-periodically 416.

In some embodiments, the threshold for the user traffic volume is dynamically changed based on historical user traffic volume peak times. In some embodiments, the threshold for the user traffic volume is associated with a bandwidth capacity of a cell, subframes, or one or more combinations thereof. In some embodiments, the threshold for the user traffic volume is associated with an SRS resource capacity of a base station or a satellite. Additionally, the user traffic volume can include small data transmission traffic, roaming traffic, real-time network traffic, other types of user traffic volume data, or one or more combinations thereof. In some embodiments, a trained machine learning model is employed to determine the user traffic volume based on historical traffic volume data during predetermined time intervals.

Figure 5:
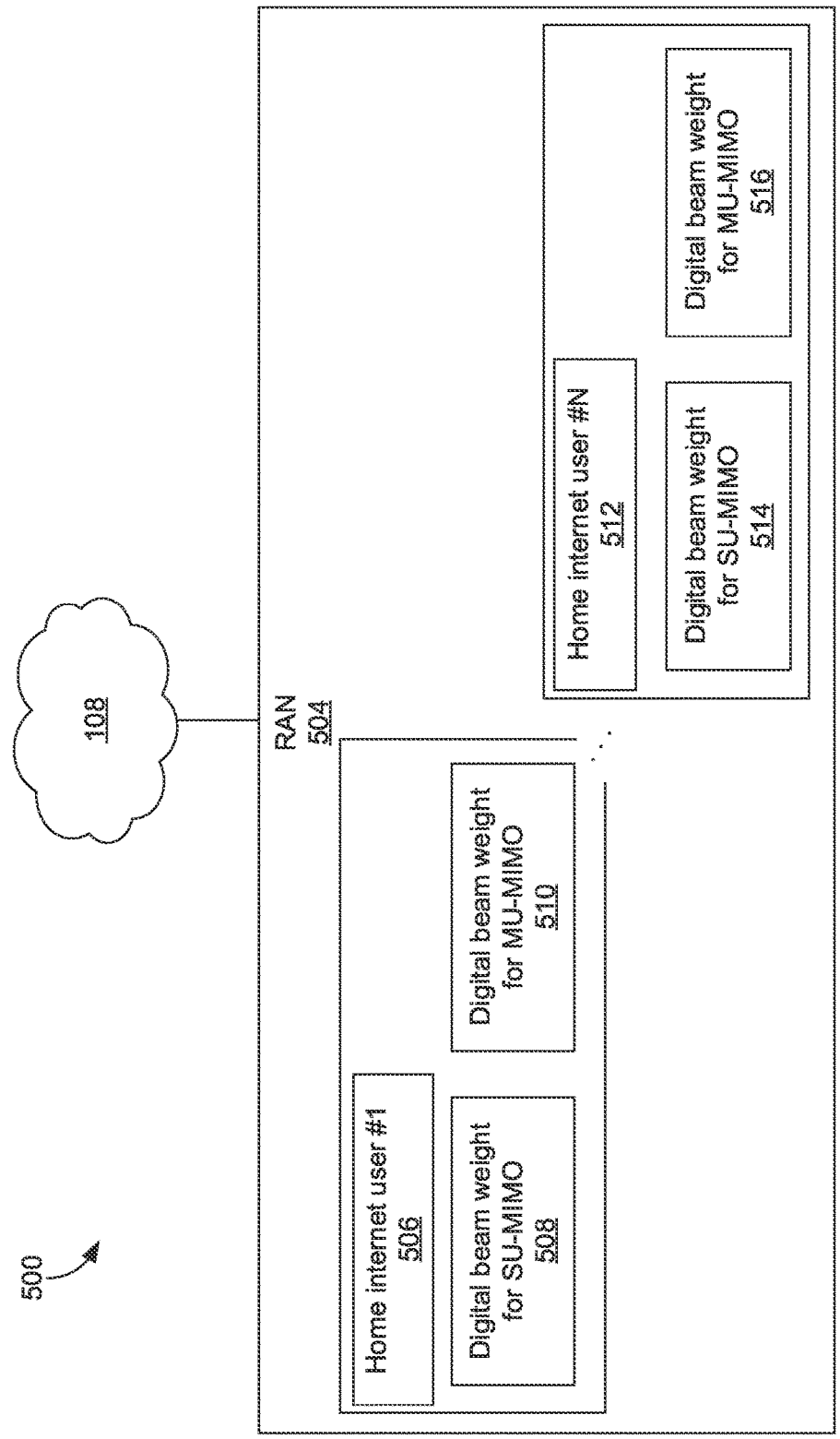
FIG. 5 illustrates an example operating environment including a radio access network that determines beam weights, in accordance with aspects herein.

FIG. 5 illustrates an example operating environment 500 for beam weight determination. Example environment 500 comprises network 108, RAN 504, a plurality of identified home internet users including home internet user 506 and home internet user 512, digital beam weight SU-MIMO 508 determination for home internet user 506, digital beam weight MU-MIMO 510 determination for home internet user 506, digital beam weight SU-MIMO 514 determination for home internet user 512, and digital beam weight MU-MIMO 516 determination for home internet user 512. In some embodiments, a plurality of home internet users correspond to a first home internet unit. In other embodiments, beam weight determinations for MU-MIMO transmissions and SU-MIMO transmissions are made for other home internet users identified for other home internet units within a threshold distance of the first home internet unit or within a portion of a coverage area associated with the first home internet unit, for example. In some embodiments, historical beam weight determinations for MU-MIMO transmissions and SU-MIMO transmissions are stored at a database associated with a base station or satellite and used to apply a current beam weight to a MU-MIMO or SU-MIMO transmission.

In some embodiments, RAN 504 can determine the beam weight for a MU-MIMO transmission corresponding to each identified home internet user of a home internet unit based on receiving SRSs corresponding to the identified home internet users. In aspects, the beam weight for the MU-MIMO transmission is determined using SRSs, historical SRSs, or one or more combinations thereof, of one or more FWA user devices within a coverage area associated with a base station or satellite. Additionally or alternatively, the beam weight for the MU-MIMO transmission is determined using SRSs, historical SRSs, or one or more combinations thereof, of eMBB user devices within a threshold distance of the first FWA device or within a portion of a coverage area associated with the first FWA device. As such, a wireless telecommunication service is provided to the user devices of the first FWA user device, wherein the wireless telecommunication service corresponds to the MU-MIMO transmission having the determined beam weight applied. For instance, the wireless telecommunication service is provided to the user devices by communicating one or more signals from the base station to the FWA user device using the determined beam weight in response to identifying the FWA user device (e.g., identification via communications between the Home Internet Unit 302 (e.g., an FWA device) and RAN 304 of FIG. 3).

In other aspects, the beam weight for the SU-MIMO transmission is determined using SRSs, historical SRSs, or one or more combinations thereof, from one or more eMBB user devices connected to the base station or a satellite. In aspects, the beam weight for the SU-MIMO transmission is determined using SRSs, historical SRSs, or one or more combinations thereof, of emBB user devices or other home internet units within a threshold distance of a first eMBB device or within a portion of a coverage area associated with the first eMBB device. As such, a wireless telecommunication service is provided to the first eMBB device, wherein the wireless telecommunication service corresponds to the SU-MIMO transmission having the determined beam weight applied. For example, the base station or satellite can communicate at least one signal to the eMBB user device using channel reciprocity-based beamforming based receiving the SRSs, historical SRSs, or one or more combinations thereof.

Figure 6:
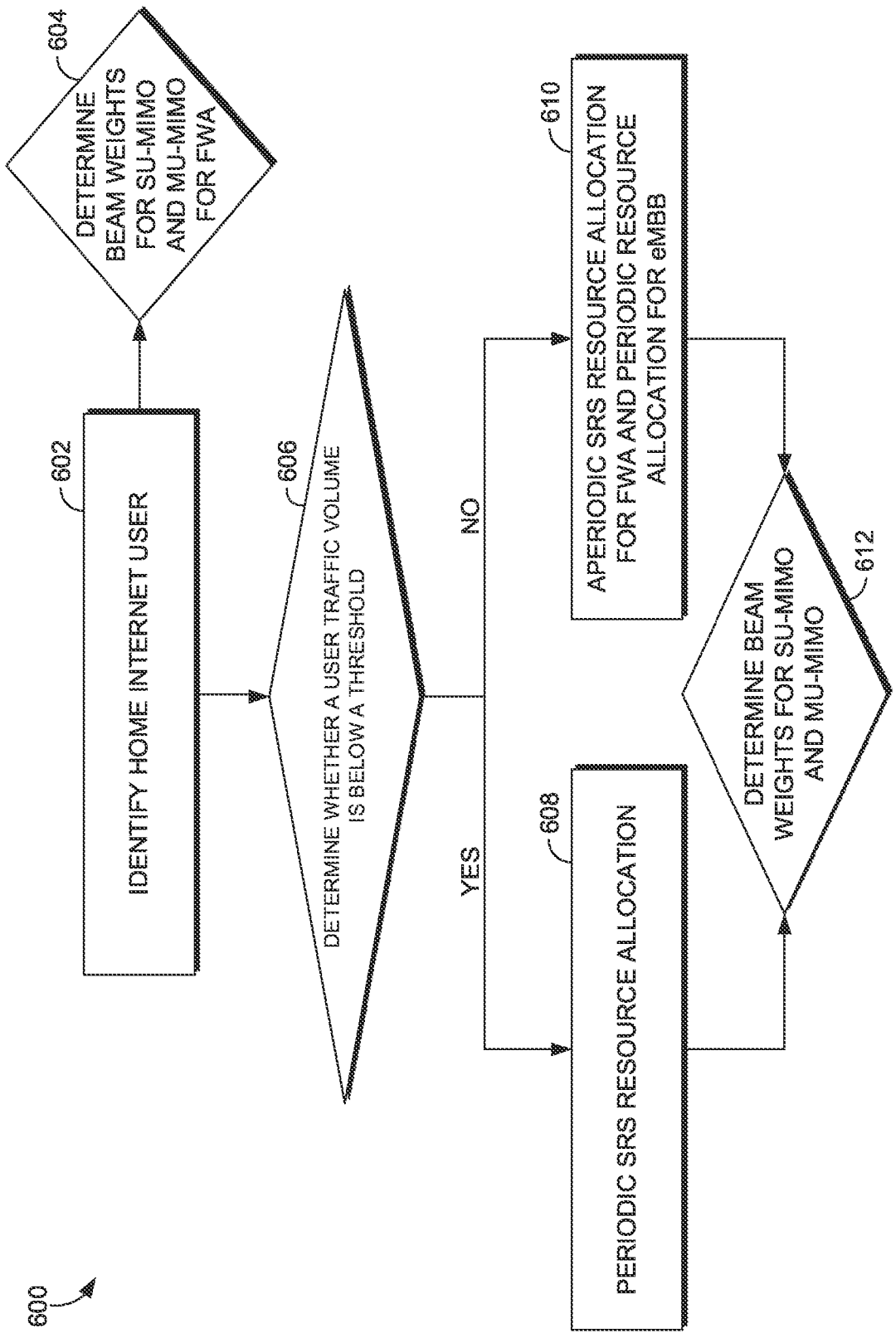
FIG. 6 illustrates an example flowchart for sounding reference signal resource allocation and beam weight determinations, in accordance with aspects herein.

FIG. 6 illustrates an example flowchart 600 for sounding reference signal resource allocation and beam weight determinations. At 602, home internet users connected with a home internet unit (e.g., in an active or idle mode) are identified. For example, FWA user devices or eMBB user devices can be identified from a device identifier, such as an IMEI for example. In embodiments, the FWA user devices can be identified based on an IMEI of each FWA user device. In some embodiments, eMBB user devices can also be identified based on an IMEI of each eMBB user device. In some embodiments, an FWA user device or eMBB user device is identified based on authentication communications with an HSS, globally unique MME identifiers, another type of device identifier, or one or more combinations thereof.

At 604, beam weights for an SU-MIMO transmission and an MU-MIMO transmission are determined for each FWA user device identified upon identification of the FWA user device. Each of the determined beam weights can be used to provide wireless telecommunication services to the FWA user device prior to receiving SRSs from the FWA user devices (e.g., by communicating at least one signal from the base station or satellite to the FWA user device). In one embodiment, a beam weight is determined based on receiving a Precoding Matrix Indicator from another user device other than the FWA user device identified. In some embodiments, the beam weight is determined based on one or more historical Precoding Matrix Indicators received from the FWA device connected to the base station prior to a present RRC connected session, beam weights of the FWA user device prior to the present RRC connected session, or one or more combinations thereof.

In some embodiments, signals (e.g., reference signals, synchronization signals, beam selection signals, other control signals) are provided (e.g., by base station 114, satellite 120A, satellite 120B, RAN 504 of FIG. 5) in different directions according to different beam weight sets associated with SU-MIMO and MU-MIMO determined beam weights. In some embodiments, the wireless telecommunication services provided to the FWA user devices, prior to receiving SRSs from the FWA user devices, are associated with MU-MIMO transmissions. Continuing the example, the MU-MIMO transmissions can be provided based on assigning the FWA user devices an MU-MIMO priority over other user devices.

At 606, a determination is made as to whether a user traffic volume is below a threshold. The user traffic volume corresponds to the home internet unit and one or more antenna elements, antennas, or antenna arrays of a base station or satellite. If the user volume traffic is below the threshold at 608, SRS resources are periodically provided to the identified home internet user devices (e.g., to a FWA user device and an eMBB user device). For example, an SRS configuration can be allocated at a predetermined periodicity to the FWA user device, the eMBB user device, or one or more combinations thereof, and at least one SRS can be received from the FWA device or eMBB device at the predetermined periodicity. In some embodiments, at least one signal can be communicated to the FWA device or eMBB device based on the at least one SRS received from the FWA device or eMBB device at the predetermined periodicity. As such, the FWA device or eMBB device can be triggered to transmit one or more SRSs periodically.

If the user volume traffic is not below the threshold at 610, SRS resources are periodically provided to eMBB user devices and a-periodically provided to the FWA user devices. For example, an SRS configuration can be allocated at a predetermined periodicity to the eMBB device and an SRS configuration can be allocated at a predetermined a-periodicity to the FWA device. Continuing the example, at least one SRS can be received from the FWA device at the predetermined a-periodicity or from the eMBB device at the predetermined periodicity. In some embodiments, at least one signal can be communicated to the FWA device or eMBB device based on the at least one SRS received from the FWA device or eMBB device. As such, the FWA device can be triggered to transmit one or more SRSs a-periodically and eMBB device can be triggered to transmit one or more SRSs periodically. Further, the SRS resources can be provided to the FWA device and the eMBB device over a wireless telecommunication service. For example, in an embodiment, the SRS resources are provided to the eMBB user devices via SU-MIMO communications, and the SRS resources are provided to the FWA user devices via MU-MIMO communications.

At 612, beam weights are determined for SU-MIMO and MU-MIMO transmissions for each identified FWA device, each identified eMBB device, or one or more combinations thereof. For example, the FWA user devices can be assigned an MU-MIMO priority over the eMBB user devices, and the FWA user devices can be provided wireless telecommunication services based on the assigned MU-MIMO priority (e.g., by communicating one or more signals from a base station or satellite corresponding to an MU-MIMO transmission). In addition, the eMBB user devices can be assigned an SU-MIMO priority over the FWA user devices, and the eMBB user devices can be provided wireless telecommunication services based on the assigned SU-MIMO priority (e.g., by communicating one or more signals from the base station or satellite corresponding to an SU-MIMO transmission). The telecommunication services corresponding to the MU-MIMO and SU-MIMO communications are provided based on the determined beam weights for each of the identified user devices. In some embodiments, the beam weight applied to the MU-MIMO transmissions can be based on SRSs received from the FWA user devices, and the beam weight applied to the SU-MIMO transmissions can be based on SRSs received from the eMBB user devices.

Figure 7A:
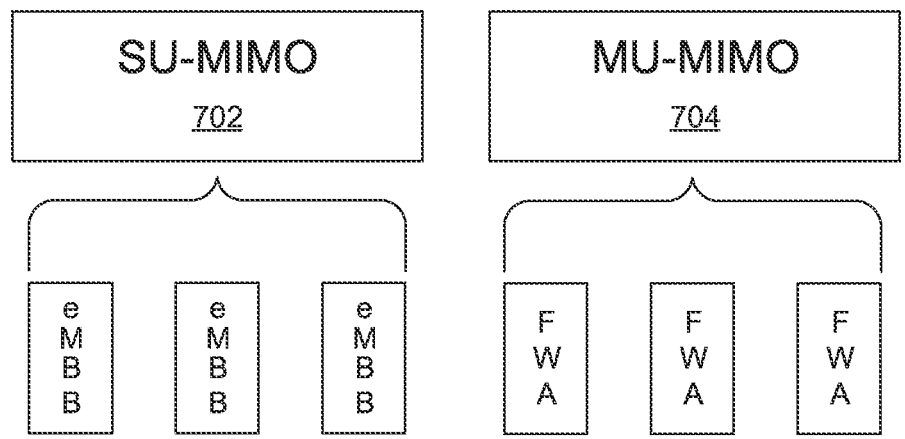
FIGS. 7A and 7B illustrate priority assignments of user devices, in accordance with aspects herein.
Figure 7B:
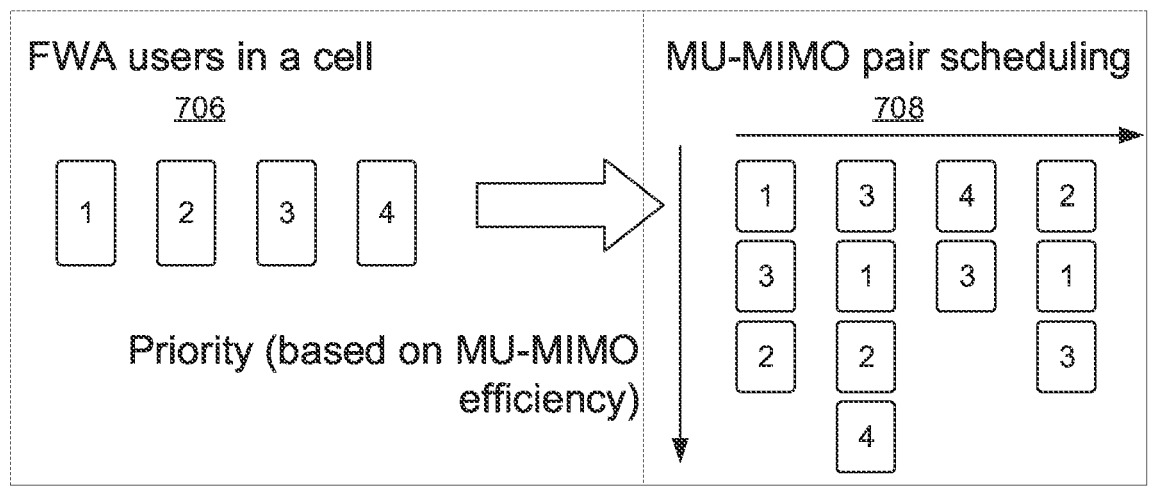

FIGS. 7A and 7B illustrate priority assignments of the FWA user devices and eMBB user devices. For example, the eMBB user devices connected to the base station or satellite, for example, are assigned an SU-MIMO priority at 702, and the FWA user devices are assigned an MU-MIMO priority at 704. At 706, the FWA user devices having the MU-MIMO priority are each assigned an MU-MIMO priority order (e.g., a pairing schedule) based on MU-MIMO efficiency. For example, the MU-MIMO priority order can be based on channel state information reference signals and location data of the FWA user devices. In some embodiments, the MU-MIMO priority order is further based on user traffic volume corresponding to antenna elements, an antenna, or antenna array of a base station, satellite, or other transmitting device providing the telecommunication services to the FWA user devices. In some embodiments, the pairing schedule for the FWA user devices is determined based on the user traffic volume. In some embodiments, the pairing scheduling is indicated to the FWA user devices based on communications between a 5G Core network and a radio access network, for example. An example of a MU-MIMO priority order determined for each of the FWA user devices is illustrated at 708.

Example User Device

Having described the example embodiments discussed above of the presently disclosed technology, an example operating environment of an example user device (e.g., user device 102A of FIG. 1) is described below with respect to FIG. 8. User device 800 is but one example of a suitable computing environment, and is not intended to suggest any particular limitation as to the scope of use or functionality of the technology disclosed. Neither should user device 800 be interpreted as having any dependency or requirement relating to any particular component illustrated, or a particular combination of the components illustrated in FIG. 8.

Figure 8:
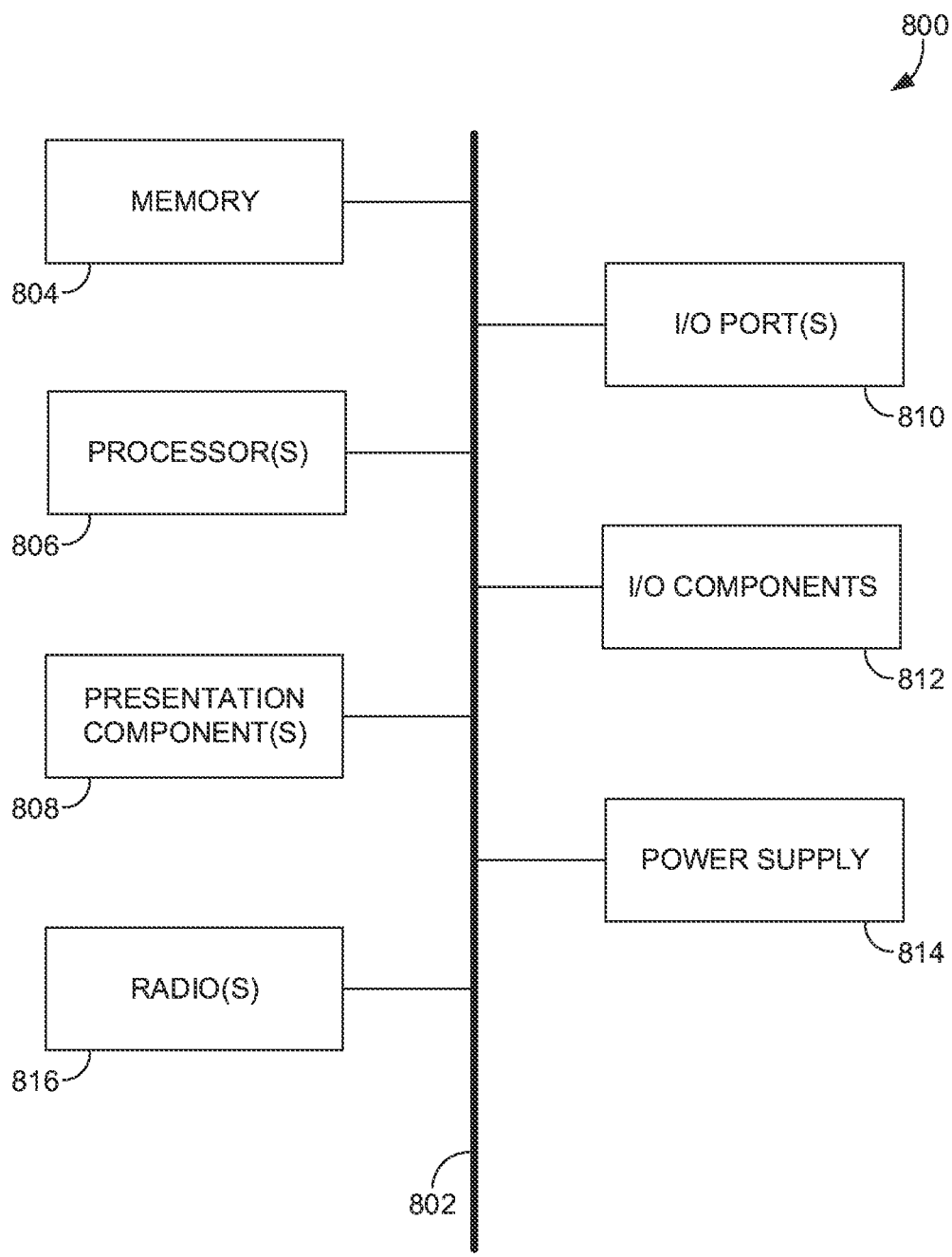
FIG. 8 depicts an example computing environment suitable for use in implementations of the present disclosure, in accordance with aspects herein.

As illustrated in FIG. 8, example user device 800 includes a bus 802 that directly or indirectly couples the following devices: memory 804, one or more processors 806, one or more presentation components 808, one or more input/output (I/O) ports 810, one or more I/O components 812, a power supply 814, and one or more radios 816.

Bus 802 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component, such as a display device, to be an I/O component. Also, processors have memory. Accordingly, FIG. 8 is merely illustrative of an exemplary user device that can be used in connection with one or more embodiments of the technology disclosed herein.

User device 800 can include a variety of computer-readable media. Computer-readable media can be any available media that can be accessed by user device 800 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 804 includes computer storage media in the form of volatile and/or nonvolatile memory. The memory 804 may be removable, non-removable, or a combination thereof. Example hardware devices of memory 804 may include solid-state memory, hard drives, optical-disc drives, other hardware, or one or more combinations thereof. As indicated above, the computer storage media of the memory 804 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 800, or one or more combinations thereof.

The one or more processors 806 of user device 800 can read data from various entities, such as the memory 804 or the I/O component(s) 812. The one or more processors 806 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 806 can execute instructions, for example, of an operating system of the user device 800 or of one or more suitable applications.

The one or more presentation components 808 can present data indications via user device 800, another user device, or a combination thereof. Example presentation components 808 may include a display device, speaker, printing component, vibrating component, another type of presentation component, or one or more combinations thereof. In some embodiments, the one or more presentation components 808 may comprise one or more applications or services on a user device, across a plurality of user devices, or in the cloud. The one or more presentation components 808 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 808 can present a visualization that compares a plurality of inspections of one or more cores of a central processing unit and a visualization of each task of each of the plurality of inspections.

The one or more I/O ports 810 allow user device 800 to be logically coupled to other devices, including the one or more I/O components 812, some of which may be built in. Example I/O components 812 can include a microphone, joystick, game pad, satellite dish, scanner, printer, wireless device, and the like. The one or more I/O components 812 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 808 on the user device 800. In some embodiments, the user device 800 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 800 may, additionally or alternatively, be equipped with accelerometers or gyroscopes that enable detection of motion. In some embodiments, the output of the accelerometers or gyroscopes may be provided to the one or more presentation components 808 of the user device 800 to render immersive augmented reality or virtual reality.

The power supply 814 of user device 800 may be implemented as one or more batteries or another power source for providing power to components of the user device 800. In embodiments, the power supply 814 can include an external power supply, such as an AC adapter or a powered docking cradle that supplements or recharges the one or more batteries. In aspects, the external power supply can override one or more batteries or another type of power source located within the user device 800.

Some embodiments of user device 800 may include one or more radios 816 (or similar wireless communication components). The one or more radios 816 can transmit, receive, or both transmit and receive signals for wireless communications. In embodiments, the user device 800 may be a wireless terminal adapted to receive communications and media over various wireless networks. User device 800 may communicate using the one or more radios 816 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 816 may facilitate communication via radio frequency signals, frames, blocks, transmission streams, packets, messages, data items, data, another type of wireless communication, or one or more combinations thereof. The one or more radios 816 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for reciprocity-based beamforming in a wireless telecommunication network, the system comprising:
   a base station having one or more antennas, the base station being associated with the wireless telecommunication network;
   one or more processors communicatively coupled with the base station; and
   computer memory storing computer-usable instructions that, when executed by the one or more processors, perform operations comprising:
   identifying a fixed wireless access (FWA) user device that is connected to the base station based on a device identifier of the FWA user device, wherein a beam weight is determined by receiving a Precoding Matrix Indicator from another user device connected with the base station and historical beam weights of the FWA user device prior to a present RRC connected session; and
   prior to receiving a Sounding Reference Signal (SRS) from the FWA user device, communicating one or more signals from the base station to the FWA user device using the determined beam weight.

2. The system according to claim 1, wherein the FWA user device is in an idle mode.

3. The system according to claim 1, the operations further comprising:
   determining that a user traffic volume corresponding to the base station is below a threshold;
   allocating an SRS configuration to the FWA user device at a predetermined periodicity;
   receiving at least one SRS from the FWA user device at the predetermined periodicity; and
   communicating at least one additional signal from the base station to the FWA user device using channel reciprocity-based beamforming based on the at least one SRS received from the FWA user device.

4. The system according to claim 1, the operations further comprising:
   determining that a user traffic volume corresponding to the base station is above a threshold; and
   based on determining that the user traffic volume is above the threshold, triggering the FWA user device to transmit SRSs a-periodically.

5. The system according to claim 4, the operations further comprising:
   identifying an Enhanced Mobile Broadband (eMBB) user device that is connected to the base station;

based on determining the user traffic volume is above the threshold, allocating an SRS configuration to the eMBB user device at a predetermined periodicity;

receiving at least one SRS from the eMBB user device at the predetermined periodicity; and communicating at least one signal from the base station to the eMBB user device using channel reciprocity-based beamforming based on the at least one SRS received from the eMBB user device.

6. The system according to claim 1, the operations further comprising:

determining that a user traffic volume corresponding to the base station is below a threshold;

identifying an Enhanced Mobile Broadband (eMBB) user device that is connected to the base station; and based on determining the user traffic volume is below the threshold, triggering the eMBB user device to transmit SRSs a-periodically.

7. The system according to claim 1, the operations further comprising:

receiving at least one SRS corresponding to the FWA user device; and communicating one or more additional signals from the base station to the FWA user device based on receiving the at least one SRS.

8. A method for prioritizing Multi-User Multiple-Input Multiple-Output (MU-MIMO) pairing priority for a fixed wireless access (FWA) user device, the method comprising:

identifying the FWA user device based on a device identifier of the FWA user device;

determining a beam weight for the FWA user device by receiving a Precoding Matrix Indicator from another user device connected with a base station and historical beam weights of the FWA user device prior to a present RRC connected session;

assigning the FWA user device an MU-MIMO priority over the eMBB user device; and communicating one or more signals from the base station to the FWA user device based on the MU-MIMO priority.

9. The method according to claim 8, further comprising:

identifying a plurality of FWA user devices and a plurality of eMBB user devices within a coverage area corresponding to the FWA user device;

assigning the plurality of FWA user devices the MU-MIMO priority; and communicating at least one signal from the base station to the plurality of FWA user devices, the at least one signal corresponding to at least one MU-MIMO transmission.

10. The method according to claim 9, further comprising:

receiving channel state information reference signals and location data corresponding to each of the plurality of FWA user devices and the FWA user device;

determining an MU-MIMO priority order of each of the plurality of FWA user devices and the FWA user device based on the channel state information reference signals and location data; and communicating the at least one signal from the base station to the plurality of FWA user devices and the FWA user device based on the MU-MIMO priority order.

11. The method according to claim 10, wherein the channel state information reference signals comprise a signal to interference and noise ratio for each of the plurality of FWA user devices and the FWA user device.

12. The method according to claim 10, wherein the MU-MIMO priority order for the FWA user device is further based on a user traffic volume corresponding to a home internet unit and an antenna array of a base station.

13. The method according to claim 8, further comprising communicating at least one signal from the base station to the eMBB user device based on the MU-MIMO priority, the at least one signal corresponding to a Single-User MIMO transmission.

14. One or more non-transitory computer storage media having computer-executable instructions embodied thereon, that when executed by at least one processor, cause the at least one processor to perform a method comprising:

identifying a fixed wireless access (FWA) user device that is connected to a base station;

based on identifying the FWA user device, determining a beam weight for at least one Multi-User Multiple-Input Multiple-Output (MU-MIMO) transmission and at least one Single-User Multiple-Input Multiple-Output (SU-MIMO) transmission, wherein the beam weight is determined by receiving a Precoding Matrix Indicator from another user device connected with the base station and historical beam weights of the FWA user device prior to a present RRC connected session;

determining whether a user traffic volume, corresponding to the base station, is below a threshold; and based on determining the beam weight for the at least one MU-MIMO transmission, the at least one SU-MIMO transmission, and based on determining whether the user traffic volume is below the threshold, communicating one or more signals from the base station to the FWA user device.

15. The one or more non-transitory computer storage media of claim 14, further comprising:

identifying an Enhanced Mobile Broadband (eMBB) user device connected to the base station;

assigning the FWA user device an MU-MIMO priority and assigning the eMBB user device an SU-MIMO priority; and communicating at least one signal, corresponding to the at least one SU-MIMO transmission and based on the beam weight, to the eMBB user device based on the SU-MIMO priority.

16. The one or more non-transitory computer storage media of claim 15, the method further comprising:

receiving at least one Sounding Reference Signal (SRS) corresponding to each of the FWA user device and the eMBB user device;

determining the beam weight for the at least one MU-MIMO transmission based on the SRS corresponding to FWA user device; and communicating the one or more signals to the FWA user device based on the beam weight determined using the SRS corresponding to the FWA user device.

17. The one or more non-transitory computer storage media of claim 16, further comprising:

determining the beam weight for the at least one SU-MIMO transmission based on the SRS corresponding to eMBB user device; and communicating the at least one signal to the eMBB user device based on the beam weight determined using the SRS corresponding to the eMBB user device.

18. The one or more non-transitory computer storage media of claim 14, the method further comprising:

determining that the user traffic volume is below the threshold;

identifying an Enhanced Mobile Broadband (eMBB) user device connected to the base station;

based on determining that the user traffic volume is below the threshold, allocating an SRS configuration to the FWA user device and the eMBB user device at a predetermined periodicity;

receiving at least one Sounding Reference Signal (SRS) from the FWA user device and the eMBB user device at the predetermined periodicity; and communicating at least one additional signal from the base station to the FWA user device and the eMBB user device using channel reciprocity-based beamforming based on receiving the at least one SRS from the FWA user device and the eMBB user device.

19. The one or more non-transitory computer storage media of claim 14, the method further comprising:

determining that the user traffic volume is above the threshold;

based on determining that the user traffic volume is above the threshold, a-periodically receiving Sounding Reference Signals (SRSs) from the FWA user device; and communicating at least one additional signal from the base station to the FWA user device using channel reciprocity-based beamforming based on a-periodically receiving the at least one SRS.

* * * * *